(12) United States Patent
Kegel et al.

(10) Patent No.: US 10,162,765 B2
(45) Date of Patent: Dec. 25, 2018

(54) ROUTING DIRECT MEMORY ACCESS REQUESTS IN A VIRTUALIZED COMPUTING ENVIRONMENT

(71) Applicants: Advanced Micro Devices, Inc., Sunnyvale, CA (US); ATI Technologies ULC, Markham (CA)

(72) Inventors: Andrew G. Kegel, Redmond, WA (US); Anthony Asaro, Toronto (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 15/491,616

(22) Filed: Apr. 19, 2017

(65) Prior Publication Data

US 2017/0220485 A1 Aug. 3, 2017

Related U.S. Application Data

(63) Continuation of application No. 14/469,928, filed on Aug. 27, 2014.

(51) Int. Cl.
*G06F 12/02* (2006.01)
*G06F 13/28* (2006.01)
(Continued)

(52) U.S. Cl.
CPC .......... *G06F 12/1081* (2013.01); *G06F 12/02* (2013.01); *G06F 12/1009* (2013.01);
(Continued)

(58) Field of Classification Search
CPC .... G06F 9/3806; G06F 9/3826; G06F 9/3828; G06F 2212/657; G06F 12/02
(Continued)

(56) References Cited

U.S. PATENT DOCUMENTS 5,961,581 A * 10/1999 Muthusamy ........ G06F 12/1433
708/670
6,128,684 A 10/2000 Okayama
(Continued)

FOREIGN PATENT DOCUMENTS

| JP | S63-245743 A | 10/1988 |
| JP | S63245743 A | 10/1998 |
| JP | H11-025033 A | 1/1999 |

OTHER PUBLICATIONS

Notification for Reason(s) of Refusal for Japanese Application No. 2017-510869, 12 pages.
(Continued)

*Primary Examiner* — Faisal M Zaman

(57) ABSTRACT

A device may receive a direct memory access request that identifies a virtual address. The device may determine whether the virtual address is within a particular range of virtual addresses. The device may selectively perform a first action or a second action based on determining whether the virtual address is within the particular range of virtual addresses. The first action may include causing a first address translation algorithm to be performed to translate the virtual address to a physical address associated with a memory device when the virtual address is not within the particular range of virtual addresses. The second action may include causing a second address translation algorithm to be performed to translate the virtual address to the physical address when the virtual address is within the particular range of virtual addresses. The second address translation algorithm may be different from the first address translation algorithm.

20 Claims, 13 Drawing Sheets

(51) Int. Cl.
*G06F 12/1009* (2016.01)
*G06F 12/1027* (2016.01)
*G06F 12/1081* (2016.01)

(52) U.S. Cl.
CPC .......... *G06F 12/1027* (2013.01); *G06F 13/28* (2013.01); *G06F 2212/2532* (2013.01); *G06F 2212/65* (2013.01); *G06F 2212/68* (2013.01)

(58) Field of Classification Search
USPC ..... 710/308; 711/6, 206, E12.061, 203, 209, 711/212
See application file for complete search history.

(56) References Cited

U.S. PATENT DOCUMENTS

| | | | |
|---|---|---|---|
| 6,282,625 B1 | 8/2001 | Porterfield | |
| 6,658,521 B1 | 12/2003 | Biran | |
| 6,889,308 B1 | 5/2005 | Schmidt | |
| 7,181,589 B2* | 2/2007 | Miller | G06F 12/1027 711/206 |
| 2005/0091383 A1 | 4/2005 | Bender | H04L 67/1097 709/228 |
| 2006/0004975 A1 | 1/2006 | Matheny | |
| 2006/0149919 A1* | 7/2006 | Arizpe | G06F 12/1009 711/206 |
| 2007/0038839 A1 | 2/2007 | Hummel et al. | |
| 2007/0162701 A1 | 7/2007 | Schlansker | |
| 2007/0233727 A1* | 10/2007 | Guy | G06F 3/0605 |
| 2007/0283123 A1 | 12/2007 | Vick et al. | |
| 2008/0005495 A1 | 1/2008 | Lowe et al. | |
| 2009/0216992 A1* | 8/2009 | Greiner | G06F 12/1009 711/206 |
| 2012/0072906 A1 | 3/2012 | Tsirkin et al. | |
| 2012/0208064 A1 | 8/2012 | Murata et al. | |
| 2013/0080733 A1 | 3/2013 | Maruyama | |
| 2013/0138873 A1 | 5/2013 | Gorobets et al. | |
| 2013/0275699 A1* | 10/2013 | Cheriton | G06F 12/00 711/162 |
| 2014/0068133 A1 | 3/2014 | Tkacik et al. | |
| 2014/0208064 A1* | 7/2014 | Basu | G06F 12/1027 711/207 |
| 2015/0281126 A1* | 10/2015 | Regula | G06F 13/4022 709/212 |
| 2016/0062911 A1* | 3/2016 | Kegel | G06F 12/1081 710/308 |
| 2016/0342399 A1* | 11/2016 | Gopalakrishnan | G06F 8/423 |

OTHER PUBLICATIONS

Extended European Search Report dated Feb. 28, 2018 for European Application No. 15836943.9, 8 pages.
Advanced Micro Devices, Inc., "AMD I/O Virtualization Technology (IOMMU) Specification", PID 34434, Rev 1.26, IOMMU Architectural Specification, Feb. 2009, 90 pages.
Advanced Micro Devices, Inc., "AMD I/O Virtualization Technology (IOMMU) Specification", PID 48882, Rev 2.00, IOMMU Architectural Specification, Mar. 24, 2011, 167 pages.
Wikipedia, "IOMMU", http://en.wikipedia.org/wiki/IOMMU, Jul. 7, 2014, 4 pages.
Wikipedia, "Direct memory access", http://en.wikipedia.org/wiki/Direct_memory_access, Aug. 27, 2014, 7 pages.
Notification of Transmittal of the International Search Report and the Written Opinion of the International Searching Authority, or the Declaration corresponding to PCT/US2015/046687, dated Mar. 18, 2016, 14 pages.
Office Action dated Jul. 20, 2018 for corresponding Korean Application No. 10-2017-7005584, 9 pages.

* cited by examiner

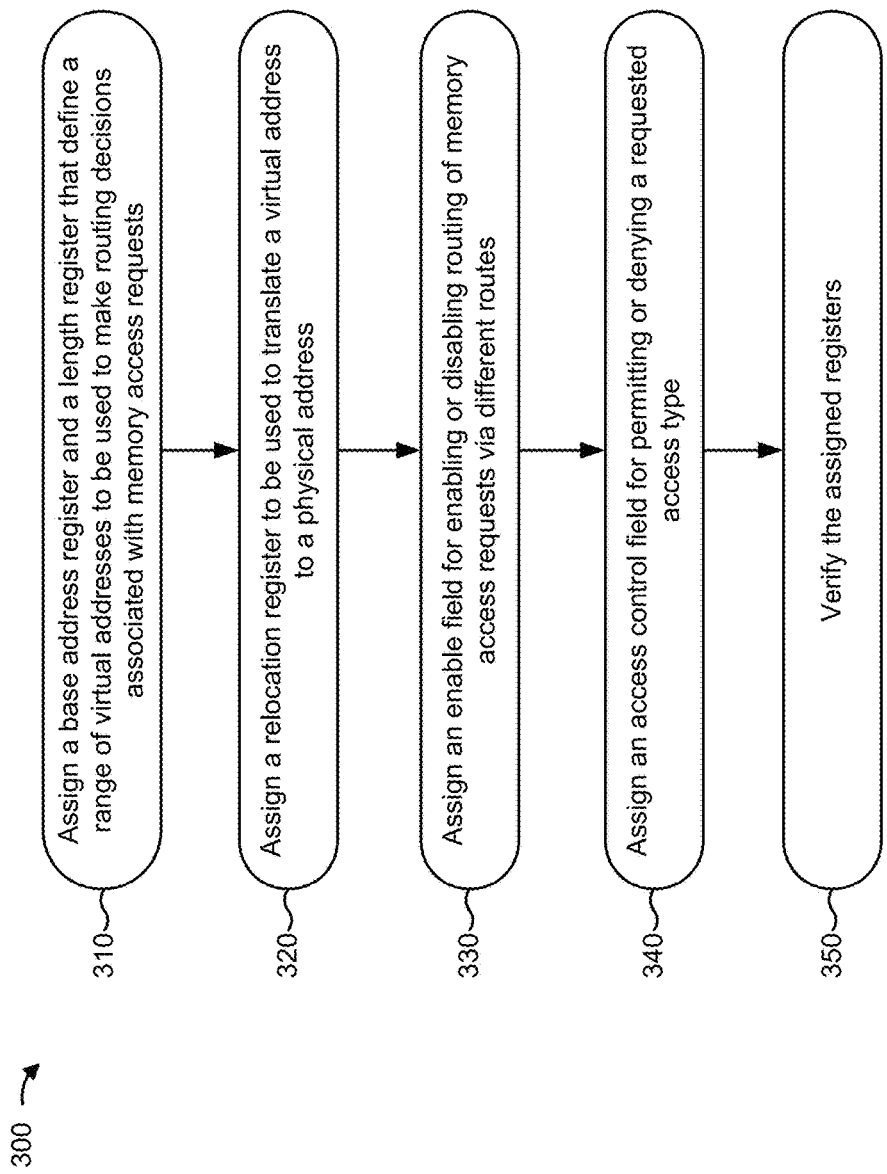

ROUTING DIRECT MEMORY ACCESS REQUESTS IN A VIRTUALIZED COMPUTING ENVIRONMENT

RELATED APPLICATION

This application is a continuation of U.S. patent application Ser. No. 14/469,928, filed Aug. 27, 2014, the contents of which are incorporated herein by reference.

BACKGROUND

An input/output memory management unit (IOMMU) may provide communication between a direct memory access (DMA)-capable device (e.g., a graphics card, a network card, a sound card, etc.) and main memory. The IOMMU may translate a virtual memory address, identified in a direct memory access request received from the DMA-capable device, into a physical address of the main memory. The IOMMU may be configured such that memory access may be provided to the DMA-capable device without being routed via a central processing unit (CPU). For example, the IOMMU may receive, from the DMA-capable device, a memory access request that identifies a virtual memory address, and may look up the virtual memory address in a page table that maps the virtual memory address to a physical memory address. Information stored in the physical memory address may then be read from or written to by the DMA-capable device.

SUMMARY OF EXAMPLE EMBODIMENTS

According to some possible embodiments, a method may include receiving, by a device, a direct memory access request that identifies a virtual address. The method may include determining, by the device, whether the virtual address is within a particular range of virtual addresses. The method may include selectively performing, by the device, a first action or a second action based on determining whether the virtual address is within the particular range of virtual addresses. The first action may include causing a first address translation algorithm to be performed to translate the virtual address to a physical address associated with a memory device when the virtual address is not within the particular range of virtual addresses. The second action may include causing a second address translation algorithm to be performed to translate the virtual address to the physical address associated with the memory device when the virtual address is within the particular range of virtual addresses. The second address translation algorithm may be different from the first address translation algorithm.

According to some possible embodiments, a device may include a controller, and the controller may receive, from a peripheral device, a memory access request that identifies a virtual address value. The controller may determine, based on information stored in a memory accessible by the controller, whether the virtual address value is included in a particular range of virtual addresses values. The controller may selectively perform a first action or a second action based on determining whether the virtual address value is included in the particular range of virtual addresses values. The controller may perform the first action when the virtual address value is not included in the particular range of virtual address values. The first action may include causing a first address translation algorithm to be performed to translate the virtual address value to a physical address value that identifies a memory location in a memory device. The controller may perform the second action when the virtual address value is included in the particular range of virtual address values. The second action may include causing a second address translation algorithm to be performed to translate the virtual address value to the physical address value. The second address translation algorithm may be different from the first address translation algorithm.

According to some possible embodiments, a system may receive a memory access request that identifies a virtual address value. The system may determine whether the virtual address value is included in a particular range of virtual addresses values. The system may selectively perform a first address translation algorithm or a second address translation algorithm, to translate the virtual address value to a physical address value associated with a memory device, based on determining whether the virtual address value is included in the particular range of virtual address values. The system may perform the first address translation algorithm when the virtual address value is not included in the particular range of virtual address values. The system may perform the second address translation algorithm when the virtual address value is included in the particular range of virtual address values. The second address translation algorithm may be different from the first address translation algorithm. The system may route the memory access request and information that identifies the physical address value toward the memory device based on selectively performing the first address translation algorithm or the second address translation algorithm.

BRIEF DESCRIPTION OF THE DRAWINGS

FIG. 3 is a flow chart of an example process for assigning memory registers to be used when routing direct memory access requests in a virtualized computing environment;

DETAILED DESCRIPTION OF EXAMPLE EMBODIMENTS

The following detailed description of example embodiments refers to the accompanying drawings. The same reference numbers in different drawings may identify the same or similar elements.

A peripheral device with a direct memory address (DMA) capability may operate in a virtualized computing environment by providing memory access requests to an input/output memory management unit (IOMMU). The IOMMU may translate a virtual address, identified in the memory access request, to a physical address associated with a block of main memory. In this way, the IOMMU may provide communication between the peripheral device, operating in a virtualized computing environment, and the main memory. However, routing memory access requests via the IOMMU may be slow and/or costly because of an amount of computing power required by the IOMMU to perform an address translation algorithm, as well as an amount of computing power required to perform various other IOMMU processes.

To speed up the routing of memory access requests, certain requests may be excluded from IOMMU processing. For example, requests that identify an address associated with a frame buffer used to refresh pixels of a display device may be excluded from IOMMU processing. However, such exclusion raises security issues, and may not provide memory address translation necessary to operate the peripheral device in a virtualized computing environment. Embodiments described herein provide a mechanism for routing memory access requests via a fast route to main memory if certain conditions are satisfied, and for routing memory access requests via a slow route to main memory if the conditions are not satisfied. Both routes provide memory address translation, and thus permit a peripheral device to operate in a virtualized computing environment while improving performance of the peripheral device.

Figure 1:
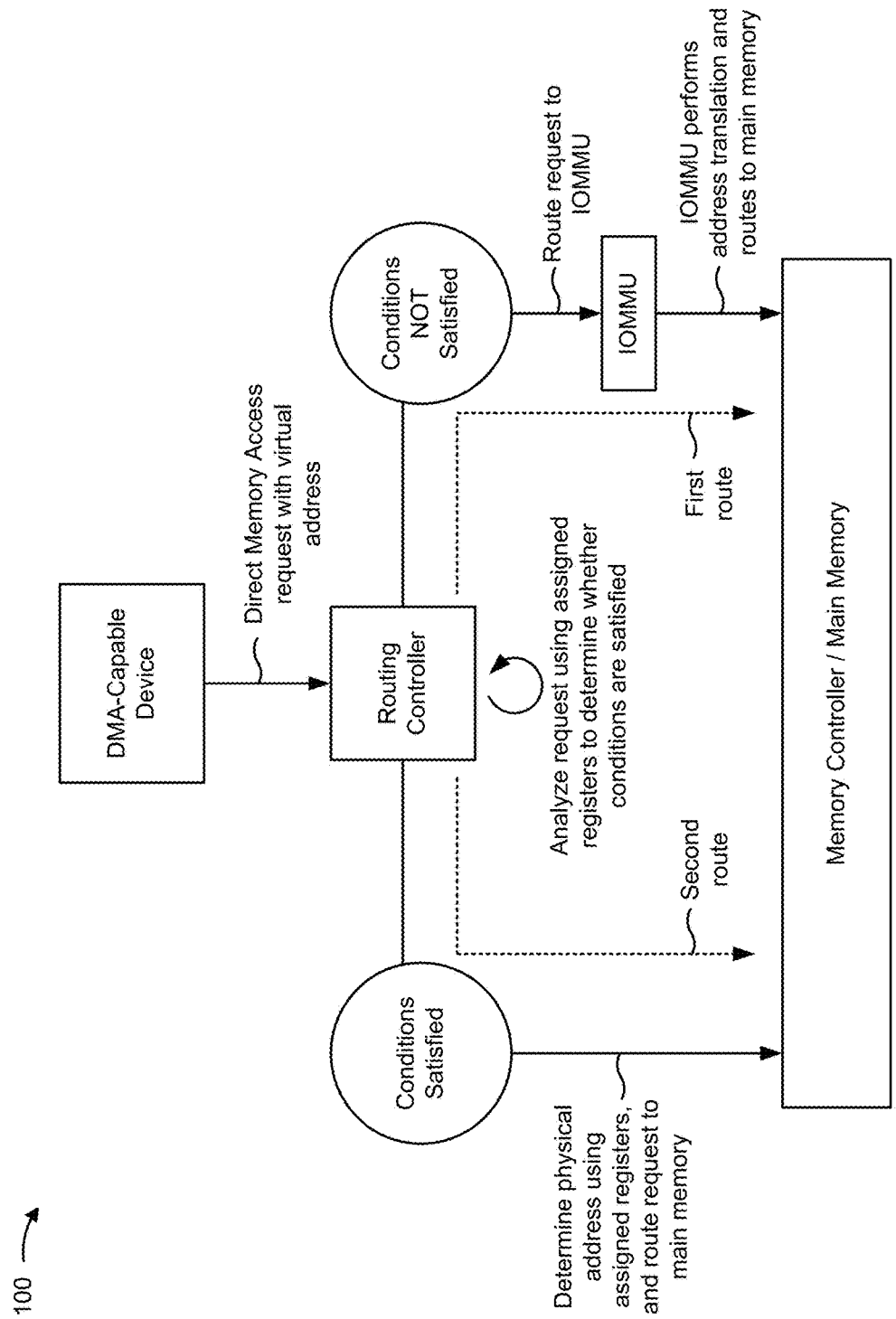
FIG. 1 is a diagram of an overview of an example embodiment described herein.

FIG. 1 is a diagram of an overview 100 of an example embodiment described herein. As shown in FIG. 1, a DMA-capable device (e.g., a peripheral device) may provide a DMA request, that identifies a virtual address, to a routing controller. The routing controller may include a device that makes a routing decision to determine whether the DMA request is to be routed via a first route that uses an IOMMU to process the request, or a second route that does not use an IOMMU to process the request. The routing controller may analyze the request to determine whether one or more conditions are satisfied. For example, the routing controller may determine whether routing via the second route is enabled, whether the virtual address is within a range of virtual addresses to be routed via the second route, whether a requested type of access (e.g., read access, write access, etc.) is permitted, or the like. The routing controller may use an assigned set of registers to perform this analysis.

As further shown in FIG. 1, if the conditions are not satisfied, the routing controller may route the DMA request via a first route. The first route may include an IOMMU, and/or may include processing the memory access request using a first address translation algorithm, to translate the virtual address to a physical address associated with the main memory. After performing address translation, the IOMMU may route the direct memory access request, including information that identifies the physical address, to a memory controller for routing to main memory.

On the other hand, if the conditions are satisfied, the routing controller may route the DMA request via a second route. The second route may not include an IOMMU, and/or may include processing the memory access request using a second address translation algorithm that is different from (and faster than) the first address translation algorithm. In this case, the routing controller may use the assigned set of registers to determine a physical address from the virtual address, and may route the DMA request to a memory controller, for routing to main memory, using the physical address.

The second address translation algorithm may be less complex than, and may be performed faster than, the first address translation algorithm. Additionally, or alternatively, the second route may exclude some processing performed by the IOMMU on the first route. Thus, the second route may provide the DMA request to main memory more quickly than the first route. In this way, the routing controller may provide increased performance for DMA-capable devices operating in a virtualized computing environment, while also providing enhanced security by analyzing DMA requests.

Figure 2:
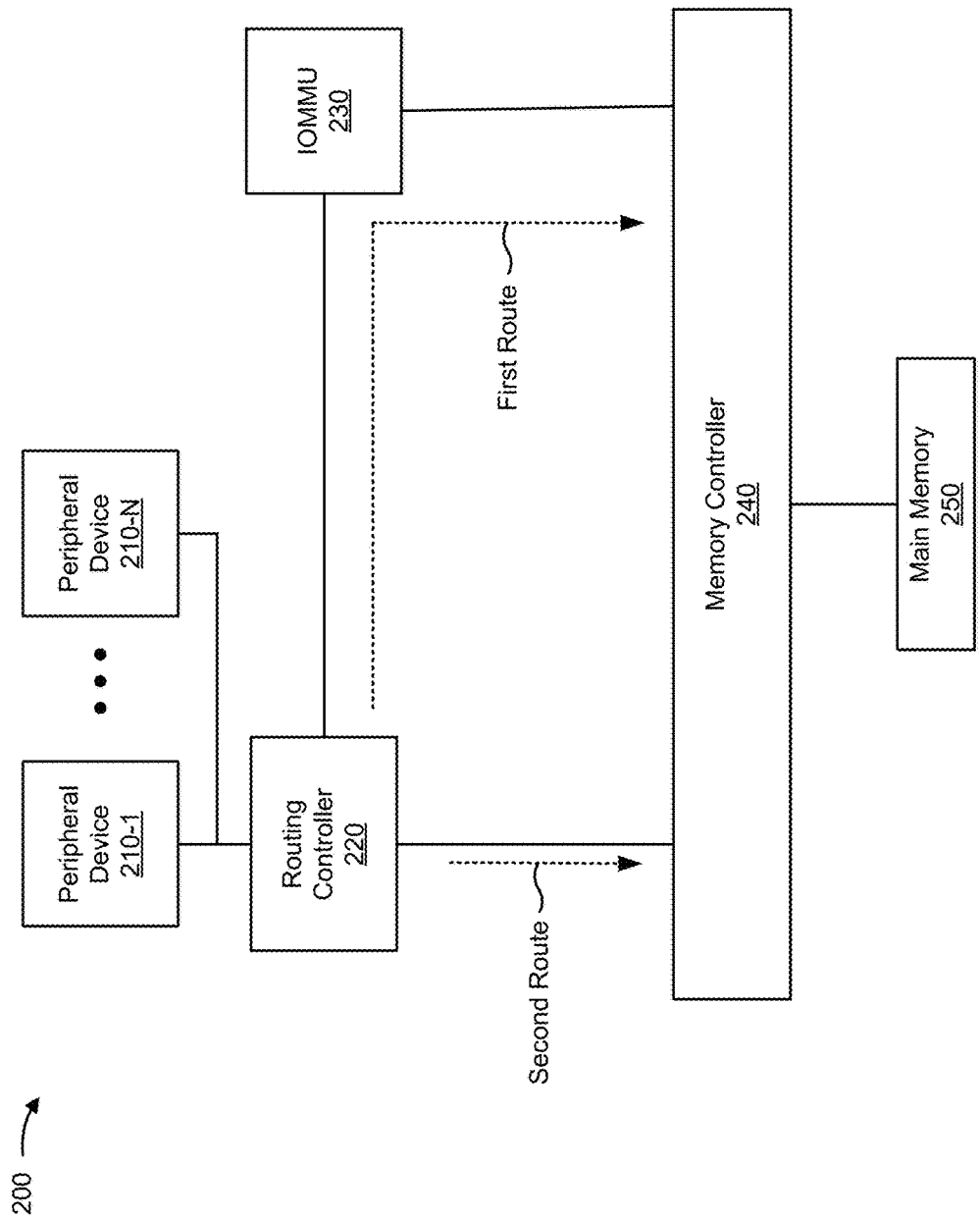
FIG. 2 is a diagram of an example system in which embodiments described herein may be implemented.

FIG. 2 is a diagram of an example system 200 in which embodiments described herein may be implemented. As shown in FIG. 2, system 200 may include one or more peripheral devices 210-1 through 210-N (N≥1) (hereinafter referred to collectively as "peripheral devices 210," and individually as "peripheral device 210"), a routing controller 220, an IOMMU 230, a memory controller 240, and a main memory 250. Devices of system 200 may connect via wired connections, wireless connections, etc.

Peripheral device 210 may include one or more devices capable of accessing main memory 250, via direct memory access, independently of a central processing unit. For example, peripheral device 210 may include a DMA-capable device, such as a graphics processing unit (GPU), an accelerated processing unit (APU), a network interface card, a sound card, a disk drive, a motherboard, or the like. In some embodiments, peripheral device 210 is a computing device with remote DMA access to main memory 250 of another computing device. As another example, peripheral device 210 may include a processor core with DMA access to main memory 250 of another processor core. Peripheral device 210 may generate a DMA request (e.g., based on an input and/or an instruction), and may provide the DMA request to routing controller 220.

Routing controller 220 may include one or more devices capable of receiving, processing, routing, and/or providing a DMA request. For example, routing controller 220 may receive a DMA request from peripheral device 210, and may analyze the DMA request to determine whether to route the DMA request via a first route or a second route to memory controller 240 and/or main memory 250. As shown, the first route may include IOMMU 230, and the second route may not include IOMMU 230. Additionally, or alternatively, the first route may include more processing of the DMA request than the second route. Thus, the first route may be a slower route than the second route. Routing controller 220 may provide the DMA request to IOMMU 230 or memory controller 240, based on the analysis of the DMA request. In some embodiments, routing controller 220 determines a physical address from a virtual address included in the DMA request. Additionally, or alternatively, routing controller 220 may provide the DMA request to another device to determine the physical address. While shown as being external to peripheral device 210, in some embodiments, routing controller 220 is integrated within peripheral device 210. Additionally, or alternatively, system 200 may include multiple routing controllers 220 that each control routing associated with one or more peripheral devices 210.

IOMMU 230 may include one or more devices capable of receiving, processing, and/or providing a DMA request. For example, IOMMU 230 may receive a DMA request from routing controller 220, and may process the DMA request before providing the DMA request to memory controller 240 and/or main memory 250. IOMMU 230 may process the DMA request by, for example, translating a virtual address to a physical address, verifying that access and/or an access type requested in the DMA request is permitted, etc. In some embodiments, IOMMU 230 uses a first algorithm, to process DMA requests routed via the first route (e.g., to perform address translation), that is different than a second algorithm used by routing controller 220 and/or another device when the DMA request is routed via the second route. In some embodiments, IOMMU 230 is electronically coupled to peripheral device 210 via a peripheral component interconnect (PCI) bus, via a PCI express bus, etc.

Memory controller 240 may include one or more devices capable of managing a flow of information going to and from main memory 250, and/or capable of reading from and/or writing to main memory 250. For example, memory controller 240 may receive a memory access request from IOMMU 230 via a first route from peripheral device 210, or may receive a memory access request from routing controller 220 via a second route from peripheral device 210. The memory access request may identify a physical address of main memory 250, may identify an operation to be performed in association with the physical address (e.g., a read operation, a write operation, etc.), and/or may identify information (e.g., data, an instruction, etc.) to be read from and/or written to the physical address. Memory controller 240 may read information from or write information to main memory 250 based on the memory access request.

Main memory 250 may include one or more devices that store information. For example, main memory 250 may include random access memory (RAM), a read-only memory (ROM), etc. Main memory 250 may store information identified by a physical memory address.

System 200 may perform one or more processes described herein. System 200 may perform these processes in response to a processor executing instructions (e.g., software instructions) stored by a computer-readable medium, such as main memory 250. A computer-readable medium is defined herein as a non-transitory memory device. A memory device includes memory space within a single physical storage device or memory space spread across multiple physical storage devices.

The number of devices shown in FIG. 2 is provided as an example. In practice, system 200 may include additional devices, fewer devices, different devices, or differently arranged devices than those shown in FIG. 2. Additionally, one or more of the devices of system 200 may perform one or more functions described as being performed by another one or more devices of system 200.

FIG. 3 is a flow chart of an example process 300 for assigning memory registers to be used when routing direct memory access requests in a virtualized computing environment. In some embodiments, one or more process blocks of FIG. 3 are performed by routing controller 220. In some embodiments, one or more process blocks of FIG. 3 are performed by another device or a group of devices separate from or including routing controller 220, such as peripheral device 210, IOMMU 230, memory controller 240, and/or main memory 250.

As shown in FIG. 3, process 300 may include assigning a base address register and a length register that define a range of virtual addresses to be used to make routing decisions associated with memory access requests (block 310). For example, routing controller 220 may assign a base address register and a length register. The base address register may store information that identifies a base address associated with a range of virtual addresses (e.g., a base virtual address that identifies one end of a range of virtual addresses), and the length register may store information that identifies a length of the range (e.g., a quantity of virtual addresses included in the range). Together, the base address and the quantity of addresses may define a range of virtual addresses to be used by routing controller 220 to make routing decisions associated with memory access requests.

As an example (using simple address values), assume that the base address register identifies a base address of 1,001. Further, assume that the length register identifies a quantity of 500 virtual addresses. Based on these two values, routing controller 220 may determine a range of 500 virtual addresses from 1,001 to 1,500, inclusive. When routing controller 220 receives a memory access request that identifies a virtual address that does not fall within this range, then routing controller 220 may route the memory access request via a first route that includes IOMMU 230. On the other hand, when routing controller 220 receives a memory access request that identifies a virtual address that falls within this range, then routing controller 220 may route the memory access request via a second route that does not include IOMMU 230.

In some embodiments, the range of virtual addresses maps to a range of physical addresses that represent a frame buffer stored in main memory 250. The frame buffer may store color values for pixels to be provided on a display device, and may be accessed by peripheral device 210 (e.g., a GPU) to periodically refresh the pixels (e.g., by obtaining a color value for a pixel and providing the value to the display device, which may display the pixel based on the color value).

As further shown in FIG. 3, process 300 may include assigning a relocation register to be used to translate a virtual address to a physical address (block 320). For example, routing controller 220 may assign a relocation register. The relocation register may store information that identifies a relocation value. The relocation value may be used by routing controller 220 to translate a virtual address, identified in a memory access request, to a physical address associated with main memory 250.

In some embodiments, routing controller 220 may modify the base address value, the length value, and/or the relocation value. For example, routing controller 220 may receive an indication that the range of virtual addresses and/or a portion of the range is associated with an error (e.g., a memory error). In this case, routing controller 230 may modify the base address and/or the length (e.g., if the error is associated with virtual memory). Additionally, or alternatively, routing controller 230 may modify the relocation value (e.g., if the error is associated with physical memory). Routing controller 220 may notify another device (e.g., peripheral device 210, IOMMU 230, etc.) of the change.

A set (e.g., triplet) of registers that includes the base address register, the length register, and the relocation register may operate together to assist routing controller 220 in making routing decisions associated with memory access requests. In some embodiments, routing controller 220 assigns multiple sets of registers (e.g., zero sets of registers, four sets of registers, eight sets of registers, etc.). In this case, the entire group of multiple sets may be enabled or disabled (e.g., using a routing control field associated with IOMMU 230) to enable or disable routing decisions (e.g., for a particular peripheral device 210, for a set of peripheral devices 210, for all peripheral devices 210, etc.).

Additionally, or alternatively, a particular set of registers may be enabled or disabled using an enable field, as described herein in connection with block 330, to enable or disable the use of the particular set of registers when making routing decisions (e.g., for one or more peripheral devices 210). Additionally, or alternatively, routing controller 220 may set access control for a particular set of registers and/or a particular set of peripheral devices 210 using an access control field, as described herein in connection with block 340.

Routing controller 220 may store an indication of a relationship between a base address register, a length register, and a relocation register (e.g., a set of registers). For example, routing controller 220 may store each register, in the set of registers, at adjacent memory addresses (e.g., in a memory-mapped input/output (MMIO) address page).

As further shown in FIG. 3, process 300 may include assigning an enable field for enabling or disabling routing of memory access requests via different routes (block 330). For example, routing controller 220 may assign an enable field. In some embodiments, the enable field is included in the relocation register. Routing controller 220 may use the enable field to determine whether to make a routing decision for a memory access request (e.g., to choose one route of multiple routes), or to forward memory access requests via a single route. For example, when the enable field indicates that routing is disabled, then routing controller 220 may forward a memory access request via a first route that includes IOMMU 230. On the other hand, when the enable field indicates that routing is enabled, then routing controller 220 may analyze a memory access request to determine whether to route the memory access request via the first route or a second route that does not include IOMMU 230.

In some embodiments, routing controller 220 controls routing for multiple peripheral devices 210. In this case, routing controller 220 may assign a set of enable fields that indicate which peripheral devices 210 are associated with routing decisions. For example, routing controller 220 may make routing decisions for memory access requests received from a first set of peripheral devices 210, and may not make routing decisions for memory access requests received from a second set of peripheral devices 210 (e.g., may forward requests received from the second set of peripheral devices 210 to IOMMU 230). Routing controller 220 may determine whether to make routing decisions for a memory access request, received from a particular peripheral device 210, based on information stored in the set of enable fields.

As further shown in FIG. 3, process 300 may include assigning an access control field for permitting or denying a requested access type (block 340). For example, routing controller 220 may assign an access control field. In some embodiments, the access control field is included in the relocation register. Routing controller 220 may use the access control field to determine whether to permit or deny a requested access type (e.g., read access, write access, no access, etc.) identified by a memory access request.

In some embodiments, routing controller 220 controls routing for multiple peripheral devices 210. In this case, routing controller 220 may assign a set of access control fields that indicate whether to permit or deny a requested access type associated with a set of peripheral devices 210. For example, routing controller 220 may apply a first access type (e.g., read access) to memory access requests received from a first set of peripheral devices 210, and may apply a second access type (e.g., read/write access) to memory access requests received from a second set of peripheral devices 210. Routing controller 220 may determine an access type to be applied to a memory access request, received from a particular peripheral device 210, based on information stored in the set of access control fields.

As further shown in FIG. 3, process 300 may include verifying the assigned registers (block 350). For example, routing controller 220 may verify the base address register, the length register, and/or the relocation register. In some embodiments, routing controller 220 verifies the assigned registers by ensuring that a particular virtual address translates to the same physical address when routed via a first route (e.g., that includes IOMMU 230 and/or that utilizes a page table to perform address translation) and when routed via a second route (e.g., that does not include IOMMU 230 and/or that utilizes a memory relocation algorithm to perform address translation).

In some embodiments, routing controller 220 repeats process 300 to set up multiple ranges of virtual addresses. Different ranges may be associated with different base address values, different length values, different relocation values, etc. In some embodiments, routing controller 220 uses a same relocation value (e.g., stored in a same relocation register) for different ranges. Additionally, or alternatively, routing controller 220 may use a same enable field and/or access control field for different ranges, or may use a different enable field and/or access control field for different ranges. In this way, routing controller 220 may set up non-contiguous ranges of physical memory for faster routing of memory access requests (e.g., memory access requests associated with graphics processing in a virtualized computing environment).

When routing controller 220 assigns multiple ranges of virtual addresses, routing controller 220 may verify the assigned registers by ensuring that multiple ranges of virtual addresses, identified by the registers, do not overlap. For example, routing controller 220 may define multiple ranges of virtual addresses using multiple base address registers and multiple respective length registers. Routing controller 220 may ensure that multiple ranges do not overlap by determining whether a particular virtual address is included in more than one range. If routing controller 220 determines that multiple ranges overlap, then routing controller 220 may provide an error notification and/or may reassign one or more registers such that the ranges do not overlap.

Although FIG. 3 shows example blocks of process 300, in some embodiments, process 300 includes additional blocks, fewer blocks, different blocks, or differently arranged blocks than those depicted in FIG. 3. Additionally, or alternatively, two or more of the blocks of process 300 may be performed in parallel.

Figure 4A:
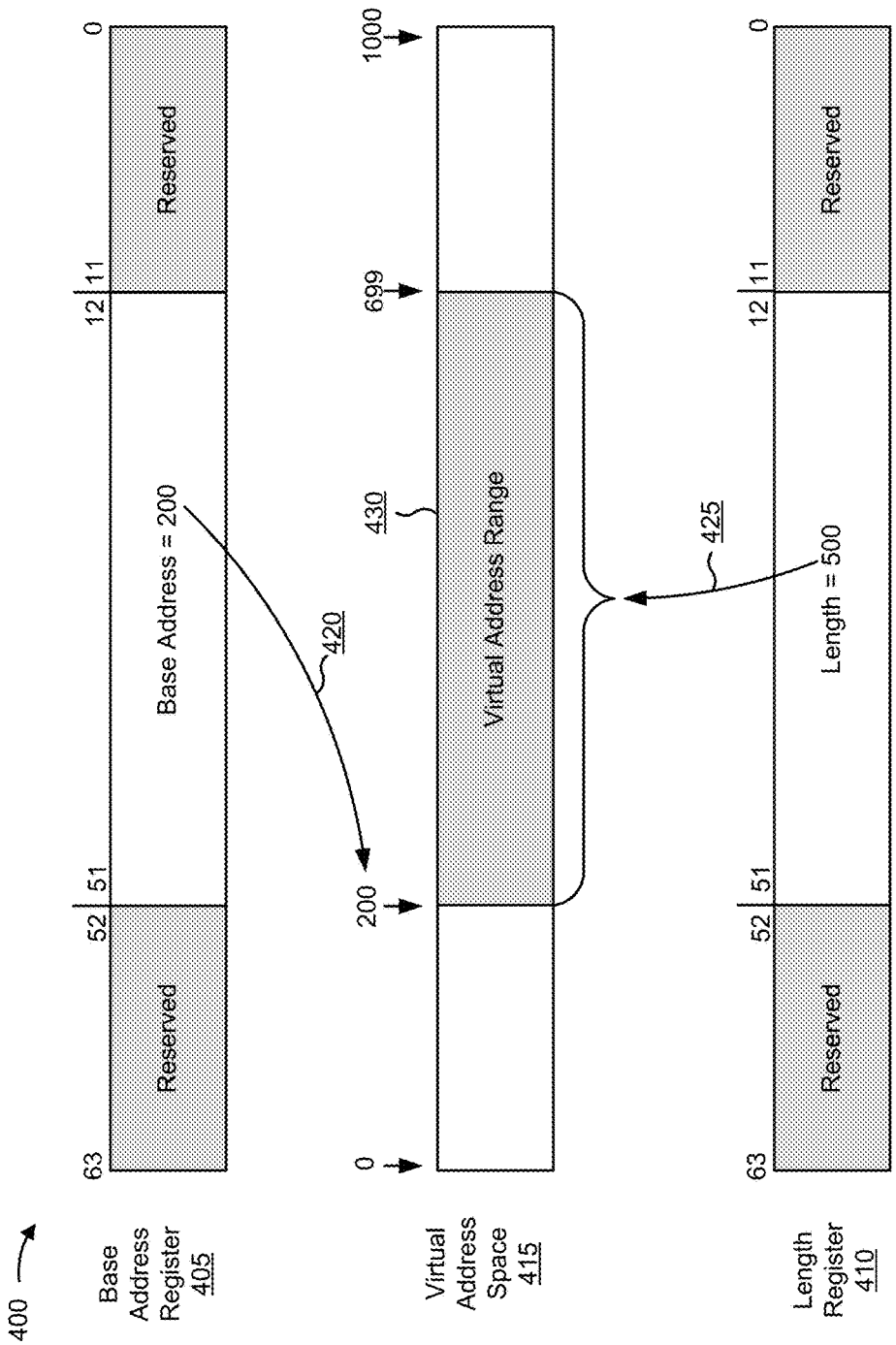
FIGS. 4A and 4B are diagrams of an example embodiment relating to the example process shown in FIG. 3.
Figure 4B:
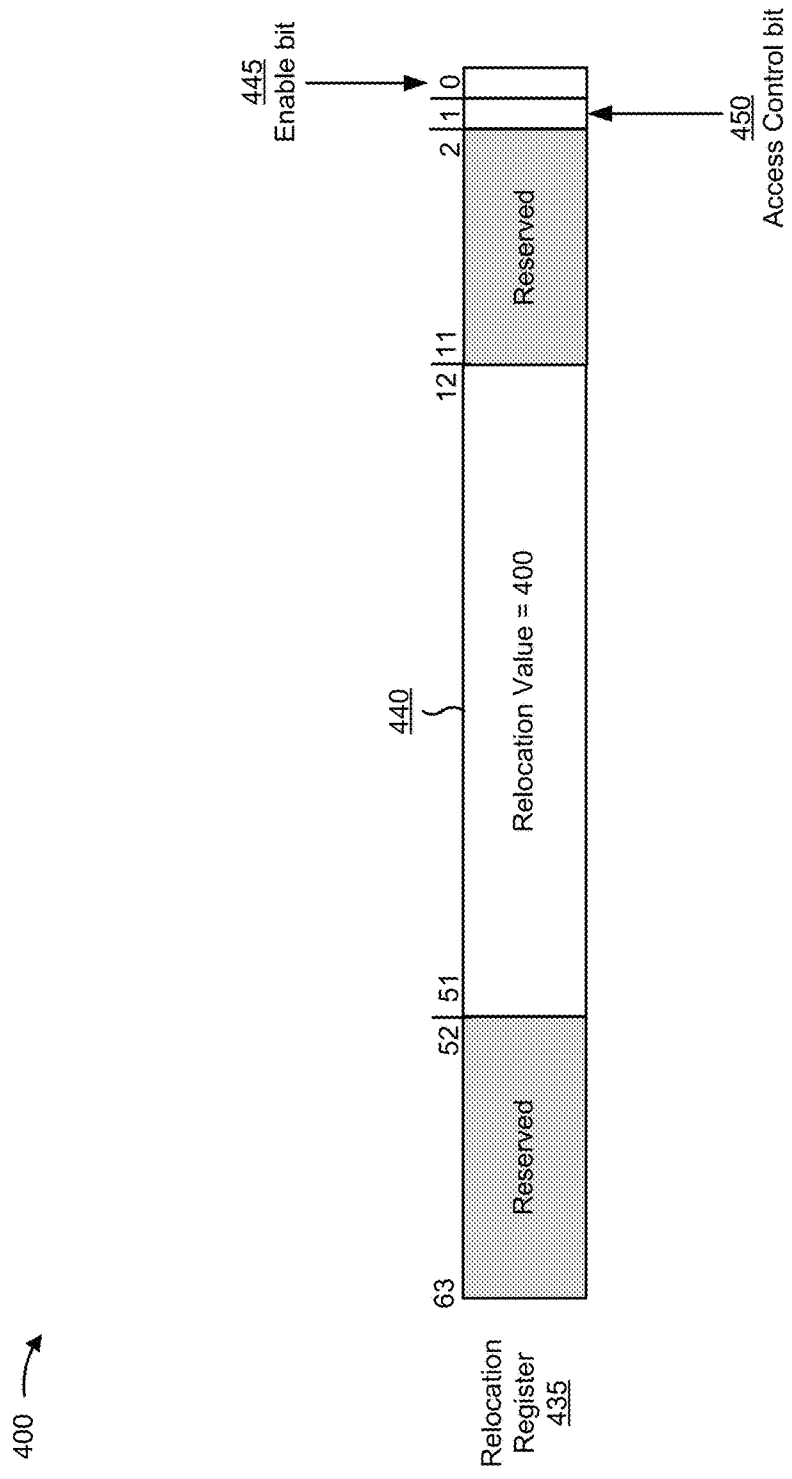

FIGS. 4A and 4B are diagrams of an example embodiment 400 relating to example process 300 shown in FIG. 3. FIGS. 4A and 4B show an example of assigning memory registers to be used when routing direct memory access requests in a virtualized computing environment.

As shown in FIG. 4A, assume that routing controller 220 assigns a base address register 405. As shown, assume that base address register 405 includes a 64-bit register (e.g., with bits 0 through 63). Further, assume that bits 0 through 11 and 52 through 63 are reserved. In some embodiments, the reserved bits are used for debugging purposes. Finally, assume that bits 12 through 51 (e.g., a total of 40 bits) are used to identify a base address with a value of 200.

As further shown in FIG. 4A, assume that routing controller 220 assigns a length register 410. As shown, assume that length register 410 includes a 64-bit register (e.g., with bits 0 through 63). Further, assume that bits 0 through 11 and 52 through 63 are reserved. Finally, assume that bits 12 through 51 (e.g., a total of 40 bits) are used to identify a length with a value of 500.

As further shown in FIG. 4A, assume that the values stored in base address register 405 and length register 410 define a range of virtual addresses, in a virtual address space 415, to be routed via a route that does not include IOMMU 230. As shown by reference number 420, the base address identifies the start of the range of virtual addresses, which begins with a virtual address of 200. As shown by reference number 425, the length identifies how many virtual addresses are included in the range. In this case, 500 virtual addresses are included in the virtual address range from 200 to 699, as shown by reference number 430.

In some embodiments, virtual address space 415 represents a range of virtual addresses corresponding to a frame buffer stored in main memory 250. The frame buffer may store color values for pixels on a display device, and may be accessed by a GPU to periodically refresh the pixels. By routing memory access requests associated with the frame buffer via a faster route that does not include IOMMU 230, routing controller 220 may ensure that a display refresh is performed more quickly than if the memory access requests were routed via a slower route that includes IOMMU 230.

As shown in FIG. 4B, assume that routing controller 220 assigns a relocation register 435. As shown, assume that relocation register 435 includes a 64-bit register (e.g., with bits 0 through 63). Further, assume that bits 2 through 11 and 52 through 63 are reserved. As shown by reference number 440, assume that bits 12 through 51 (e.g., a total of 40 bits) are used to identify a relocation value with a value of 400. As shown by reference number 445, assume that bit 0 is used as an enable bit that indicates whether routing controller 220 is to make routing decisions for memory access requests. As shown by reference number 450, assume that bit 1 is used as an access control bit that identifies a type of access permitted for memory access requests (e.g., read access, write access, read and write access, etc.).

As indicated above, FIGS. 4A and 4B are provided merely as an example. Other examples are possible and may differ from what was described with regard to FIGS. 4A and 4B.

Figure 5:
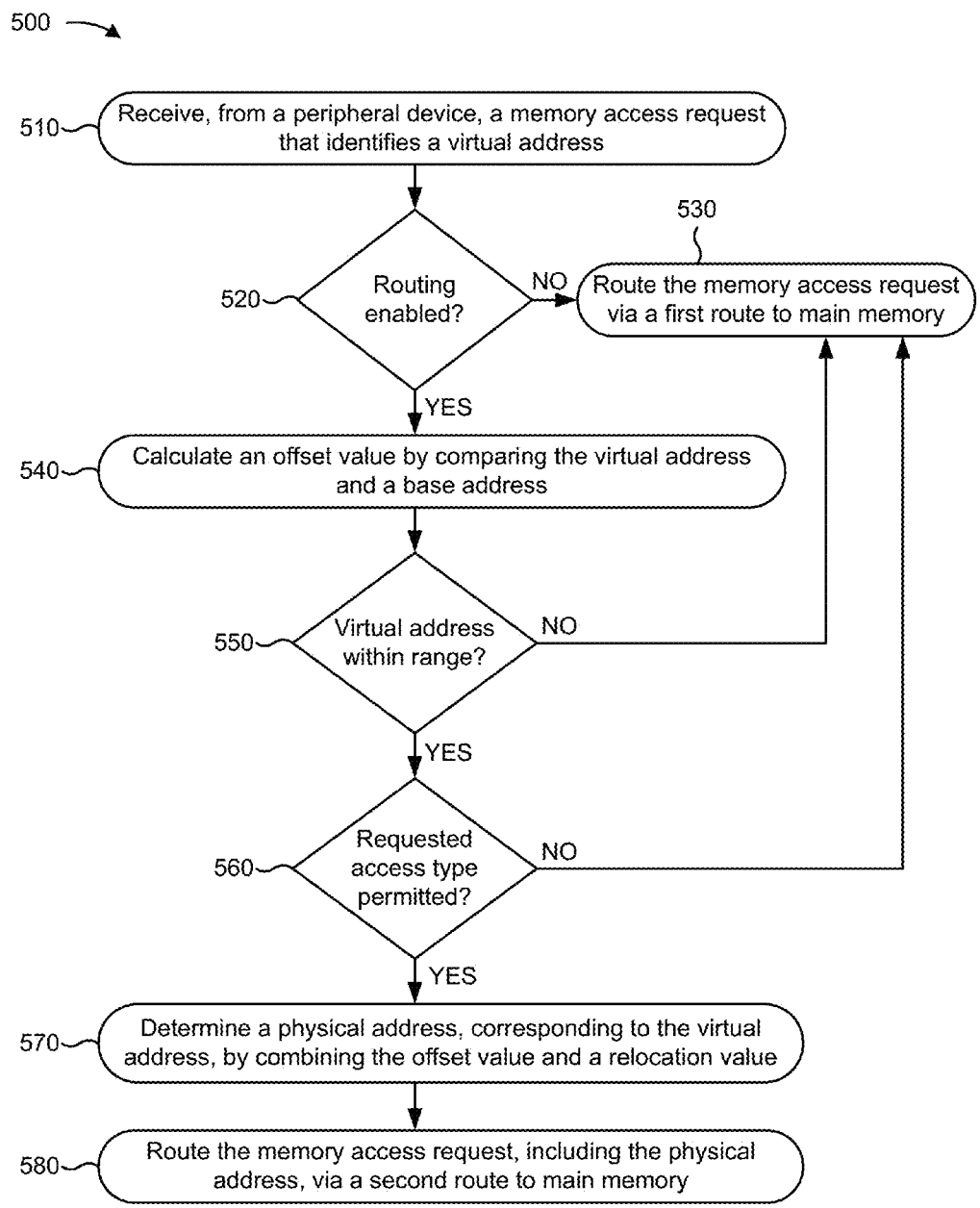
FIG. 5 is a flow chart of an example process for routing direct memory access requests in a virtualized computing environment.

FIG. 5 is a flow chart of an example process 500 for routing direct memory access requests in a virtualized computing environment. In some embodiments, one or more process blocks of FIG. 5 are performed by routing controller 220. In some embodiments, one or more process blocks of FIG. 5 are performed by another device or a group of devices separate from or including routing controller 220, such as peripheral device 210, IOMMU 230, memory controller 240, and/or main memory 250.

As shown in FIG. 5, process 500 may include receiving, from a peripheral device, a memory access request that identifies a virtual address (block 510). For example, routing controller 220 may receive, from peripheral device 210, a memory access request. The memory access request includes a direct memory access request, in some embodiments. Additionally, or alternatively, the memory access request may identify a virtual address, such as a guest physical address associated with peripheral device 210.

In some embodiments, the memory access request identifies an access type associated with the memory access request. For example, the memory access request may include a request to read information from main memory 250, a request to write information to main memory 250, etc. Additionally, or alternatively, the memory access request may identify information to be read from and/or written to main memory 250.

As further shown in FIG. 5, process 500 may include determining whether routing is enabled (block 520). For example, routing controller 220 may determine whether routing is enabled by reading an enable bit (e.g., included in a relocation register). A value of the enable bit may provide an indication of whether routing is enabled (e.g., when the enable bit includes a first value, such as one) or disabled (e.g., when the enable bit includes a second value, such as zero).

If routing is not enabled (block 520—NO), then process 500 may include routing the memory access request via a first route to main memory (block 530). For example, if routing controller 220 determines that routing is not enabled (e.g., if the enable bit indicates that routing is not enabled), then routing controller 220 may route the memory access request via a first route to memory controller 240 and/or main memory 250.

In some embodiments, the first route to memory controller 240 and/or main memory 250 includes IOMMU 230, and a second route to memory controller 240 and/or main memory 250 does not include IOMMU 230. Additionally, or alternatively, the first route may include more processing (e.g., by IOMMU 230), of the memory access request, than the second route. Additionally, or alternatively, the first route may have a higher latency (e.g., a higher average latency) to memory controller 240 and/or main memory 250 relative to the second route.

Additionally, or alternatively, a memory access request routed via the first route may undergo address translation via a different algorithm than an algorithm used in association with a memory access request routed via the second route. For example, address translation on the first route may utilize one or more page tables to translate a virtual address to a physical address. In some embodiments, the first route utilizes multiple page tables to perform address translation. Conversely, address translation on the second route may not utilize any page tables. Rather, address translation on the second route may utilize a memory relocation algorithm that determines a physical address by adding a value to or subtracting a value from another value (e.g., a virtual address value, an offset value determined based on the virtual address value and a base address value, etc.). In this way, address translation on the second route may be faster than address translation on the first route (e.g., because memory relocation may be faster than using page tables).

If routing is enabled (block 520—YES), then process 500 may include calculating an offset value by comparing the virtual address and a base address (block 540). For example, if routing controller 220 determines that routing is enabled (e.g., if the enable bit indicates that routing is enabled), then routing controller 220 may calculate an offset value by comparing the virtual address, identified in the memory access request, and a base address.

In some embodiments, routing controller 220 calculates the offset value as a difference between the virtual address and the base address. For example, routing controller 220 may subtract the base address (e.g., a value that represents the base address) from the virtual address (e.g., a value that represents the virtual address) to calculate the offset value. As an example, assuming a base address value of 1,000 and a virtual address value of 1,300, routing controller 220 may calculate an offset value of 300 (1,300−1,000=300).

As further shown in FIG. 5, process 500 may include determining whether the virtual address is within a range of virtual address associated with routing memory access requests (block 550). For example, routing controller 220 may determine whether the virtual address is within the range determined as described herein in connection with FIG. 3. In some embodiments, routing controller 220 determines whether the virtual address is within the range based on the offset value. For example, routing controller 220 may compare the offset value to a first threshold value (e.g., zero) and/or a second threshold value (e.g., a length value, identified in a length register) to determine whether the virtual address is within the range.

Routing controller 220 determines a set of assigned registers to apply to the memory access request, in some embodiments. For example, multiple sets of registers may be assigned, and routing controller 220 may select a set of registers to apply to the memory access request. Additionally, or alternatively, routing controller 220 may apply more than one set of registers to the memory access request until a virtual address, identified in the memory access request, is determined to be within a range of virtual addresses associated with a particular set of registers. In this case, routing controller 220 may apply the particular set of registers to the memory access request. If the virtual address is not within any of the ranges, then routing controller 220 may route the memory access request via the first route.

In some embodiments, a first range of virtual addresses overlaps with a second range of virtual addresses. In this case, routing controller 220 may select one of the ranges, and may apply a set of registers, associated with the selected range, to the memory access request.

If the virtual address is not within the range (block 550—NO), then process 500 may include routing the memory access request via a first route to main memory (block 530). For example, if routing controller 220 determines that the virtual address is not within the range, then routing controller 220 may route the memory access request via a first route to memory controller 240 and/or main memory 250, as described herein in connection with block 530.

In some embodiments, routing controller 220 determines that the virtual address is not within the range when the offset value satisfies a first threshold or a second threshold. The first threshold may be equal to zero, and the second threshold may correspond to the length value. For example, routing controller 220 may determine that the virtual address is not within the range when the offset value is less than zero. For example, assume that routing controller 220 receives a memory access request that identifies a virtual address of 900. Further, assume that the base address value is 1,000. In this example, the offset value is equal to −100 (900−1,000=−100). Since −100 is less than zero, this offset value indicates that the virtual address of 900 is out of the range (e.g., since the range starts at 1,000).

Additionally, or alternatively, routing controller 220 may determine that the virtual address is not within the range when the offset value is greater than or equal to the length value. For example, assume that the offset value is equal to 300, and assume that the length value is equal to 200. Since the offset value is greater than the length value, routing controller 220 determines that the virtual address is not within the range, and routes the memory access request via the first route. In this example, the base address value of 1,000 identifies a starting address of 1,000 for the range, and the length value of 200 identifies an ending value of 1,199 for the range (e.g., there are 200 values between 1,000 and 1,199, inclusive). The virtual address of 1,300, which generated the offset value of 300 (1,300−1,000), is outside of this range. Similarly, a virtual address of 1,200, which generates an offset value of 200, which is equal to the length value, would be outside the range.

Thus, routing controller 220 may determine that the virtual address is not within the range when the offset value is less than zero, or when the offset value is greater than or equal to the length value. By using the offset value to determine whether the virtual address is within the range, routing controller 220 may reduce an amount of computing resources required to determine whether the virtual address is within the range, relative to directly comparing the virtual address to the ending value of the range.

If the virtual address is within the range (block 550—YES), then process 500 may include determining whether a requested access type is permitted (block 560). For example, if routing controller 220 determines that the virtual address is within the range, then routing controller 220 may determine whether an access type, identified in the memory access request, is permitted.

In some embodiments, routing controller 220 determines that the virtual address is within the range when the offset value satisfies a first threshold and a second threshold. The first threshold may be equal to zero, and the second threshold may correspond to the length value. For example, routing controller 220 may determine that the virtual address is within the range when the offset value is greater than or equal to zero, and when the offset value is less than the length value. For example, assume that routing controller 220 receives a memory access request that identifies a virtual address of 1,300. Further, assume that the base address value is 1,000. In this example, the offset value is equal to 300 (1,300−1,000=300). Since 300 is greater than zero, this offset value indicates that the virtual address of 1,300 may be within the range (e.g., depending on the length value).

Continuing with the above example where the offset value is equal to 300, assume that the length value is equal to 500. Since the offset value is less than the length value, routing controller 220 determines that the virtual address is within the range. In this example, the base address value of 1,000 identifies a starting address of 1,000 for the range, and the length value of 500 identifies an ending value of 1,499 for the range (e.g., there are 500 values between 1,000 and 1,499, inclusive). The virtual address of 1,300, which generated the offset value of 300 (1,300−1,000), is within this range.

Routing controller 220 determines whether a requested access type is permitted by reading an access control bit (e.g., included in a relocation register), in some embodiments. A value of the access control bit may provide an indication of whether a particular type of access (e.g., read access, write access, etc.) is permitted or denied.

If the requested access type is not permitted (block 560—NO), then process 500 may include routing the memory access request via a first route to main memory (block 530). For example, if routing controller 220 determines that the requested access type is not permitted (e.g., based on reading the access control bit), then routing controller 220 may route the memory access request via a first route to memory controller 240 and/or main memory 250, as described herein in connection with block 530. Additionally, or alternatively, routing controller 220 may provide an indication of an error when the requested access type is not permitted.

As an example, assume that a memory access request, that identifies a particular virtual address, includes a request to write to main memory 250. Further, assume that the access control bit indicates that the particular virtual address, or a physical address associated with the particular virtual address, is read-only. In this case, routing controller 220 routes the memory access request via the first route toward main memory 250 (e.g., that includes IOMMU 230). IOMMU 230 may deny access, may provide an error, etc.

If the requested access type is permitted (block 560—YES), then process 500 may include determining a physical address, corresponding to the virtual address, by combining the offset value and a relocation value (block 570). For example, if routing controller 220 determines that the requested access type is permitted (e.g., based on reading the access control bit), then routing controller 220 may combine the offset value and a relocation value, identified in a relocation register, to determine a physical address that corresponds to the virtual address.

As an example, a memory access request may include a read request, and the access control bit may indicate that read requests are permitted. Additionally, or alternatively, the memory access request may include a write request, and the access control bit may indicate that write requests are permitted. In these cases, routing controller 220 may calculate a physical address, that corresponds to the virtual address, based on the virtual address and a relocation value identified in the relocation register.

In some embodiments, routing controller 220 determines the physical address by combining (e.g., adding, subtracting, etc.) the offset value and the relocation value. For example, assume that routing controller 220 has determined an offset value of 300, as described elsewhere herein. Further, assume that routing controller 220 identifies a relocation value of 400 in the relocation register. Routing controller 220 may add these values to determine a physical address value of 700 (300+400=700).

As further shown in FIG. 5, process 500 may include routing the memory access request, including the physical address, via a second route to main memory (block 580). For example, routing controller 220 may route the memory access request toward the determined physical address associated with main memory 250. In some embodiments, routing controller 220 routes the memory access request via a second route to main memory 250.

As described elsewhere herein, the second route to memory controller 240 and/or main memory 250 may not include IOMMU 230. Additionally, or alternatively, the second route may require less processing, of the memory access request, than the first route. Additionally, or alternatively, the second route may have a lower latency (e.g., a lower average latency) to memory controller 240 and/or main memory 250 relative to the first route. Additionally, or alternatively, a memory access request routed via the second route may undergo address translation via a different algorithm than an algorithm used in association with a memory access request routed via the first route. Additionally, or alternatively, the second route may use one or more prediction algorithms (e.g., buffering, look-ahead, etc.) to increase performance relative to the first route. Additionally, or alternatively, the first route may cause a set of operations to be performed based on the memory access request, and the second route may cause a subset of the set of operations to be performed based on the memory access request.

Routing the memory access request to main memory 250 may cause information to be read from and/or written to a physical address that corresponds to a virtual address identified in the memory access request. In some embodiments, routing controller 220 and/or memory controller 240 provides cache coherency between multiple peripheral devices 210 and/or a peripheral device 210 and a central processing unit. For example, memory controller 240 may provide, to a cache controller of a first device, an indication that a second device wrote to a particular physical address of main memory 250. The cache controller may modify a cache associated with the first device to ensure cache coherency. For example, the cache controller may mark a cached write operation, associated with the particular physical address, as invalid, or may flush a cached read operation associated with the particular physical address.

In this way, routing controller 220 may provide a way to speed up memory access requests associated with a particular memory resource, such as a frame buffer. Additionally, routing controller 220 may permit a peripheral device, such as graphics processing unit, to operate in a virtualized computing environment while performing at a level near that of a non-virtualized computing environment.

Although FIG. 5 shows example blocks of process 500, in some embodiments, process 500 includes additional blocks, fewer blocks, different blocks, or differently arranged blocks than those depicted in FIG. 5. Additionally, or alternatively, two or more of the blocks of process 500 may be performed in parallel.

FIGS. 6A-6E are diagrams of an example embodiment 600 relating to example process 500 shown in FIG. 5. FIGS. 6A-6E show an example of various routing decisions that route a memory access request via a first path that includes IOMMU 230.

Figure 6A:
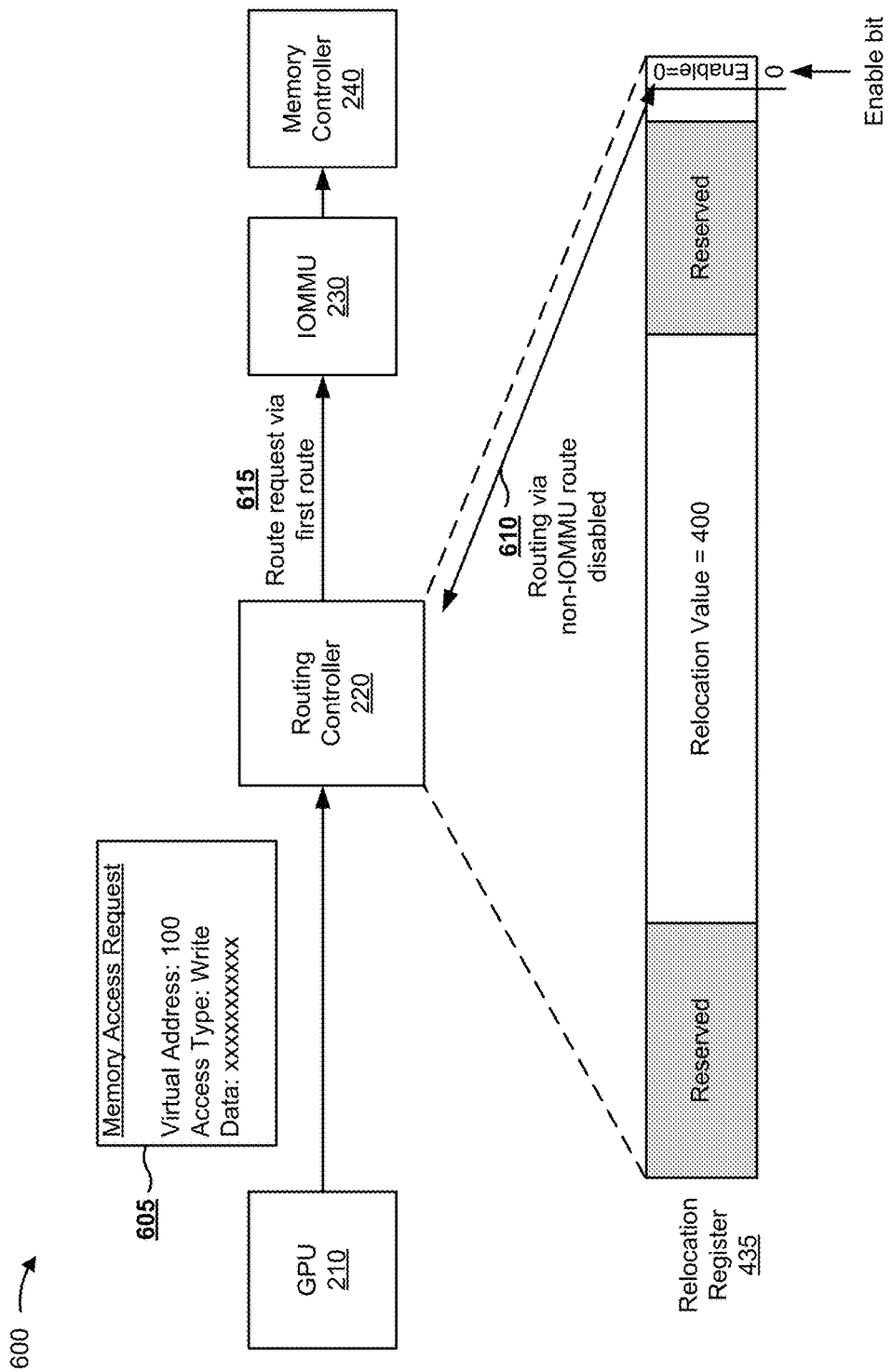
FIGS. 6A-6E are diagrams of an example embodiment relating to the example process shown in FIG. 5.

As shown in FIG. 6A, and by reference number 605, assume that a GPU 210 provides a memory access request to routing controller 220. As shown, assume that the memory access request identifies a virtual address of 100, identifies an access type of write, and identifies some information to be written to a physical memory address corresponding to the virtual address of 100. Assume that routing controller 220 receives the request, and determines a value of an enable bit stored in relocation register 435. As shown by reference number 610, assume the enable bit stores a value of zero, which indicates that routing the memory access request via a second route to main memory 250 (e.g., a route that does not include IOMMU 230) is disabled. Thus, as shown by reference number 615, routing controller 220 routes the memory access toward memory controller 240 via a first route that includes IOMMU 230.

Figure 6B:
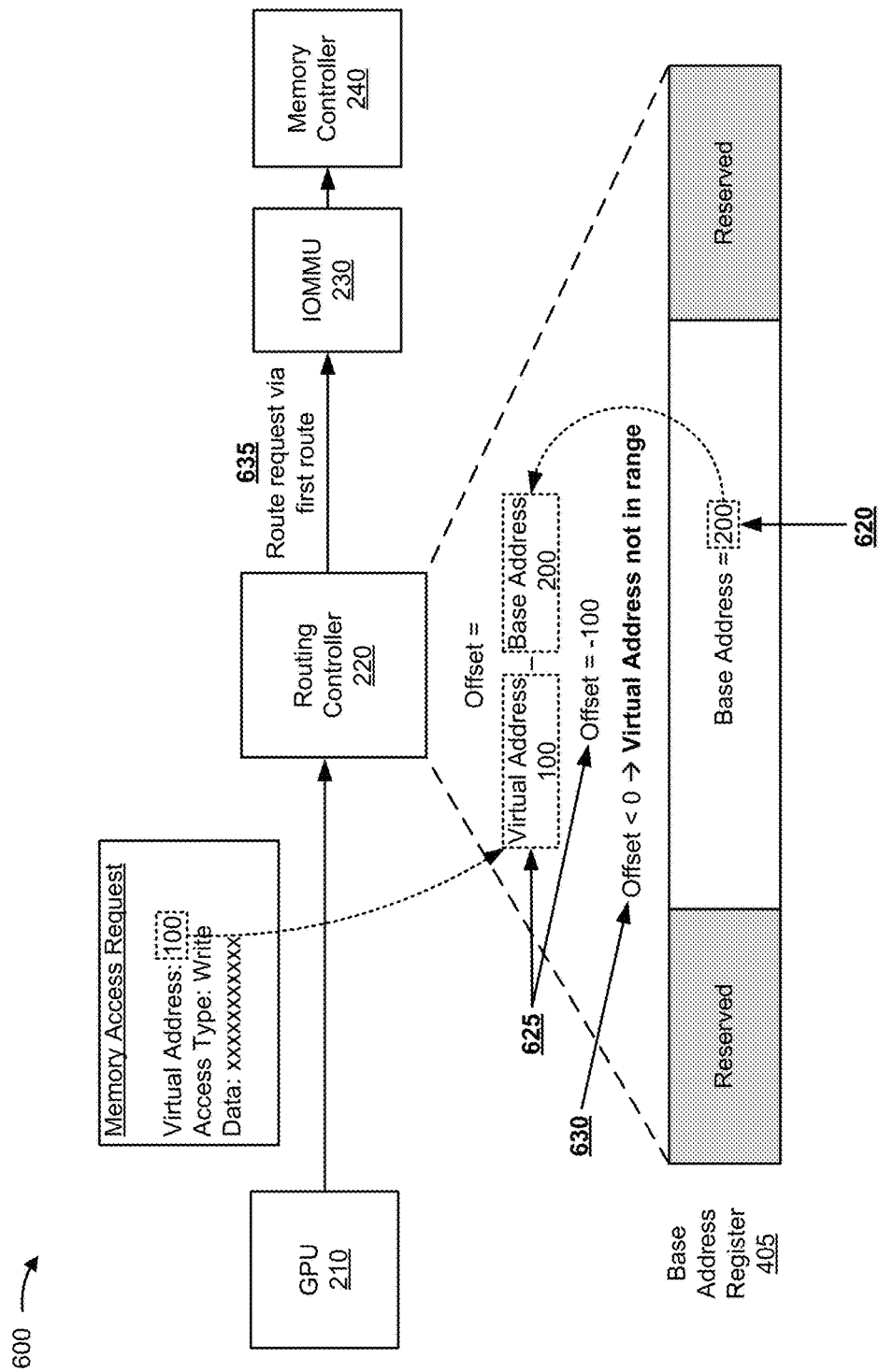

For the purpose of FIG. 6B, assume that routing controller 220 receives the same memory access request from GPU 210. In this case, however, assume that routing controller 220 determines that routing via the second route is enabled (e.g., determines that the enable bit stores a value of one). As shown by reference number 620, assume that routing controller 220 determines a base address value of 200 stored in base address register 405. As shown by reference number 625, routing controller 220 subtracts the base address value of 200 from the virtual address value of 100 to generate an offset value of −100 (100−200=−100). As shown by reference number 630, routing controller 220 determines that the offset value is less than zero, and thus the virtual address of 100 is outside the range of virtual address associated with routing via the second route. Thus, as shown by reference number 635, routing controller 220 routes the memory access toward memory controller 240 via a first route that includes IOMMU 230.

Figure 6C:
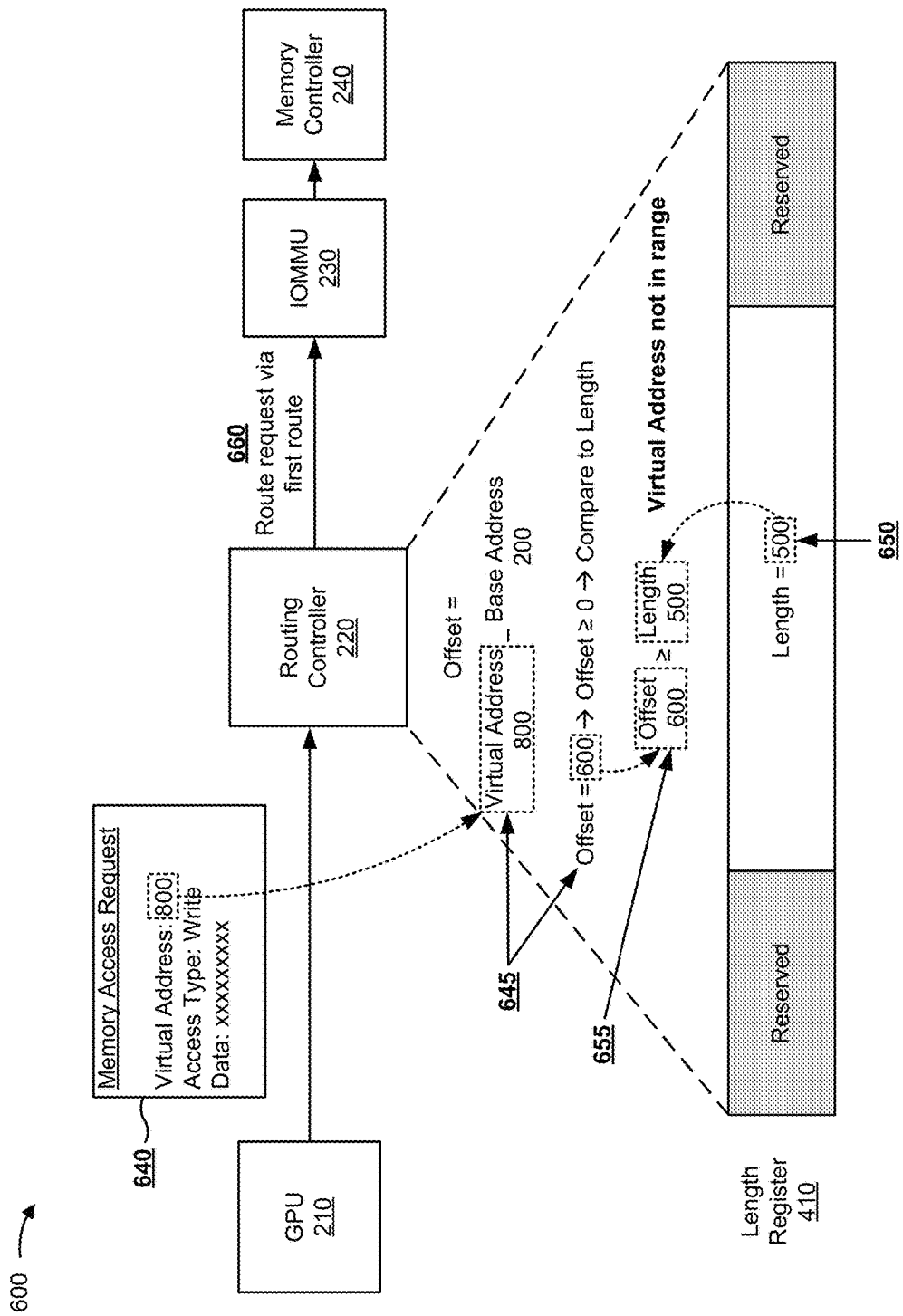

As shown in FIG. 6C, and by reference number 640, assume that GPU 210 provides a different memory access request to routing controller 220. As shown, assume that the memory access request identifies a virtual address of 800, identifies an access type of write, and identifies some information to be written to a physical memory address corresponding to the virtual address of 800. For the purpose of FIG. 6C, assume that routing via the second path is enabled, and that the base address value is equal to 200 (e.g., as shown in FIG. 6B).

As shown by reference number 645, assume that routing controller 220 subtracts the base address value of 200 from the virtual address value of 800 to generate an offset value of 600 (800−200=600). Since the offset value is greater than zero, routing controller 220 determines to compare the offset value to a length value stored in length register 410. As shown by reference number 650, assume that routing controller 220 determines a length value of 500 stored in length register 410. As shown by reference number 655, routing controller 220 compares the offset value to the length value, determines that the offset value is greater than the length value, and thus determines that the virtual address of 800 is not within the range of virtual addresses to be routed via the second path. As a result, routing controller 220 routes the memory access toward memory controller 240 via a first route that includes IOMMU 230, as shown by reference number 660.

Figure 6D:
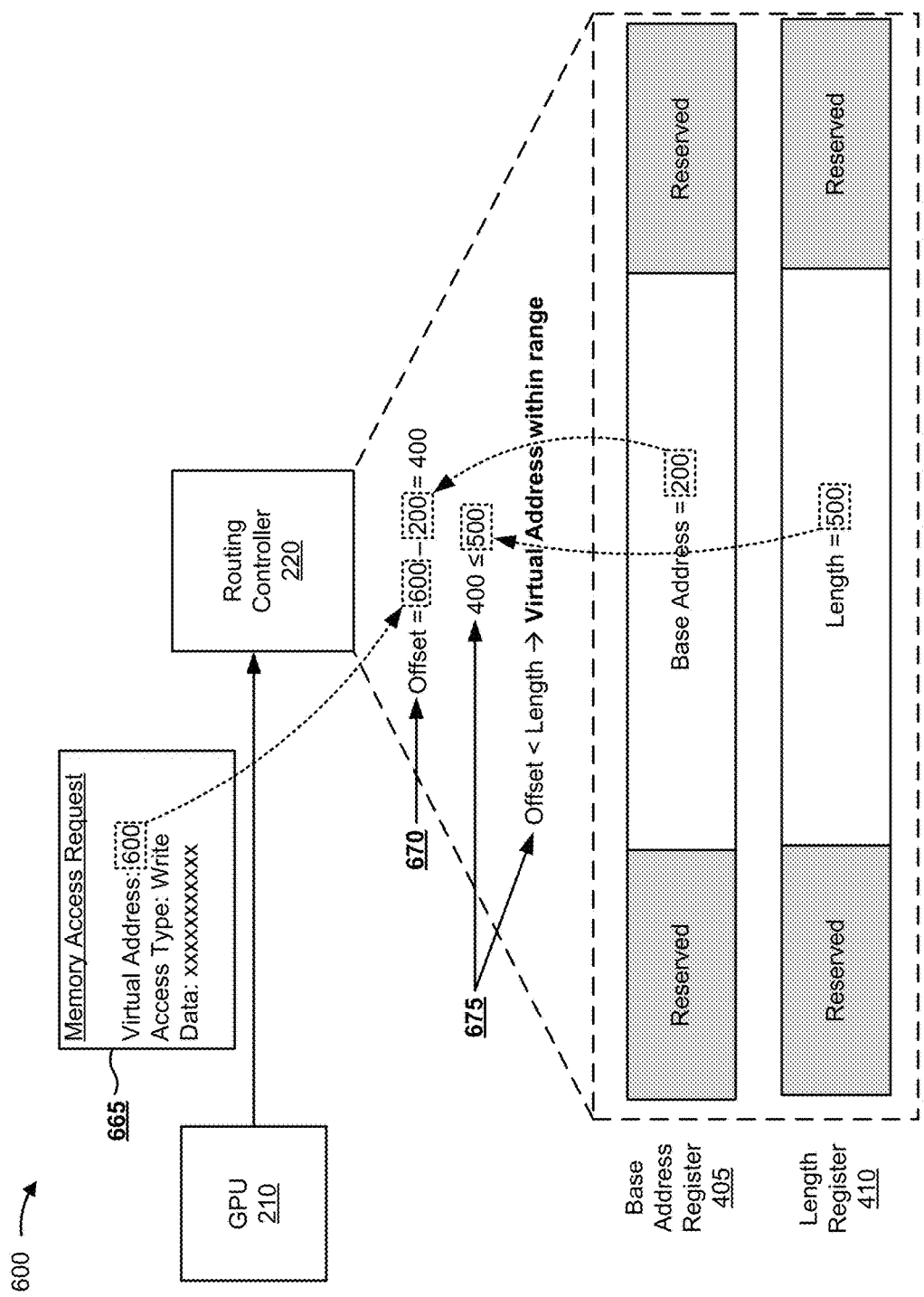

As shown in FIG. 6D, and by reference number 665, assume that GPU 210 provides a different memory access request to routing controller 220. As shown, assume that the memory access request identifies a virtual address of 600, identifies an access type of write, and identifies some information to be written to a physical memory address corresponding to the virtual address of 600. For the purpose of FIG. 6D, assume that routing via the second path is enabled, that the base address value is equal to 200, and that the length value is equal to 500.

As shown by reference number 670, routing controller 220 subtracts the base address value of 200 from the virtual address value of 600 to calculate an offset value of 400 (600−200=400). As shown by reference number 675, routing controller 220 determines that the offset value of 400 is less than the length value of 500. Based on this determination, routing controller 220 determines that the virtual address of 600 is within the range of virtual addresses associated with routing via the second route.

Figure 6E:
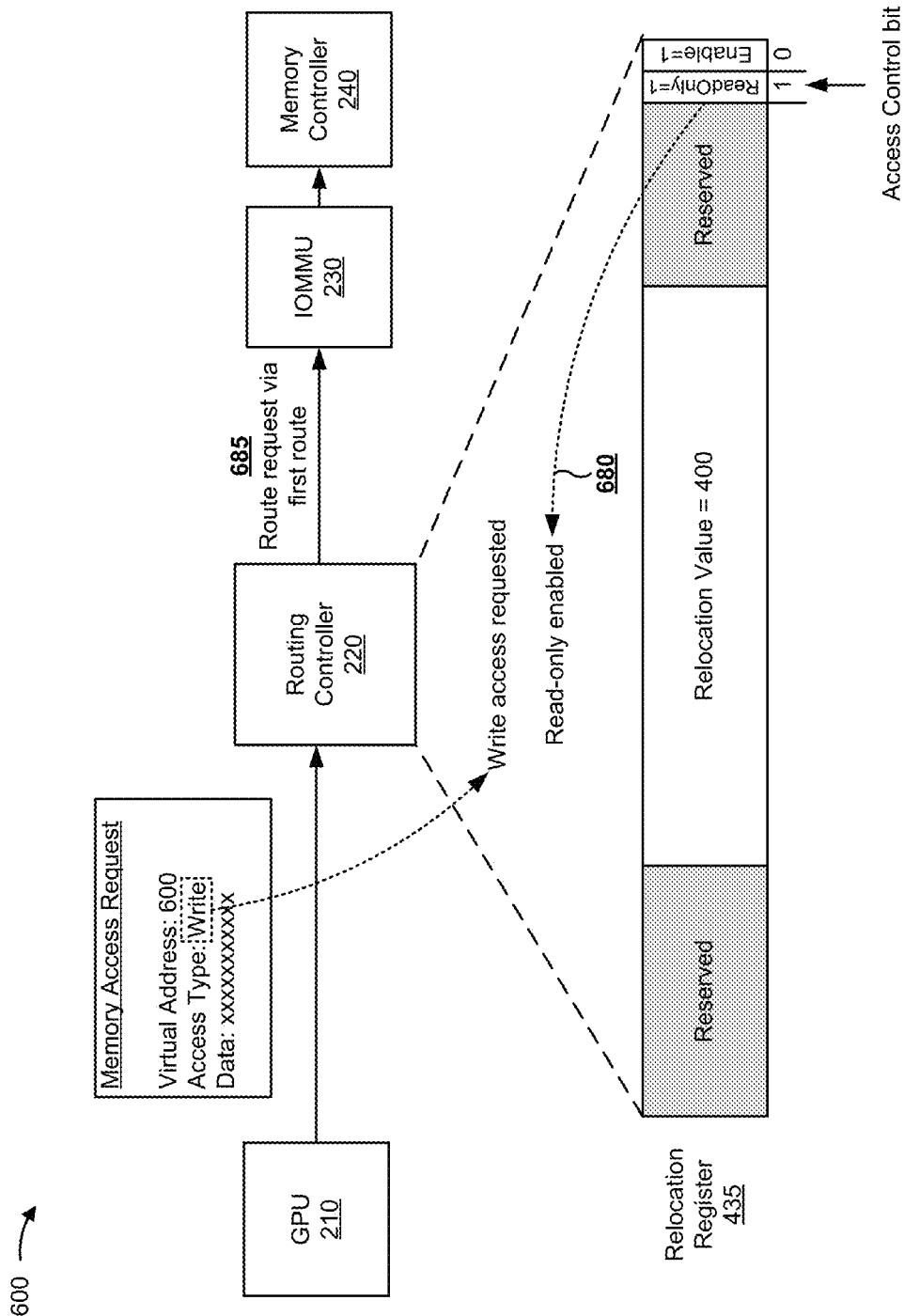

Assume that FIG. 6E continues the example shown in FIG. 6D, and that the virtual address of 600, identified in the memory access request received by routing controller 220, is within the range of virtual addresses associated with routing via the second route. As shown in FIG. 6E, and by reference number 680, assume that routing controller 220 determines that an access control bit, stored in relocation register 435, stores a value of 1, which indicates that a read-only access control is enabled. Assume that the memory access request identifies a write operation. As a result, and as shown by reference number 685, routing controller 220 routes the memory access toward memory controller 240 via a first route that includes IOMMU 230. However, if the memory access request identified a read operation, then routing controller 220 would determine a physical address that corresponds to the virtual address of 600, and would route the memory access request via a second route to memory controller 240 (e.g., a route that does not include IOMMU 230).

As indicated above, FIGS. 6A-6E are provided merely as an example. Other examples are possible and may differ from what was described with regard to FIGS. 6A-6E.

Figure 7A:
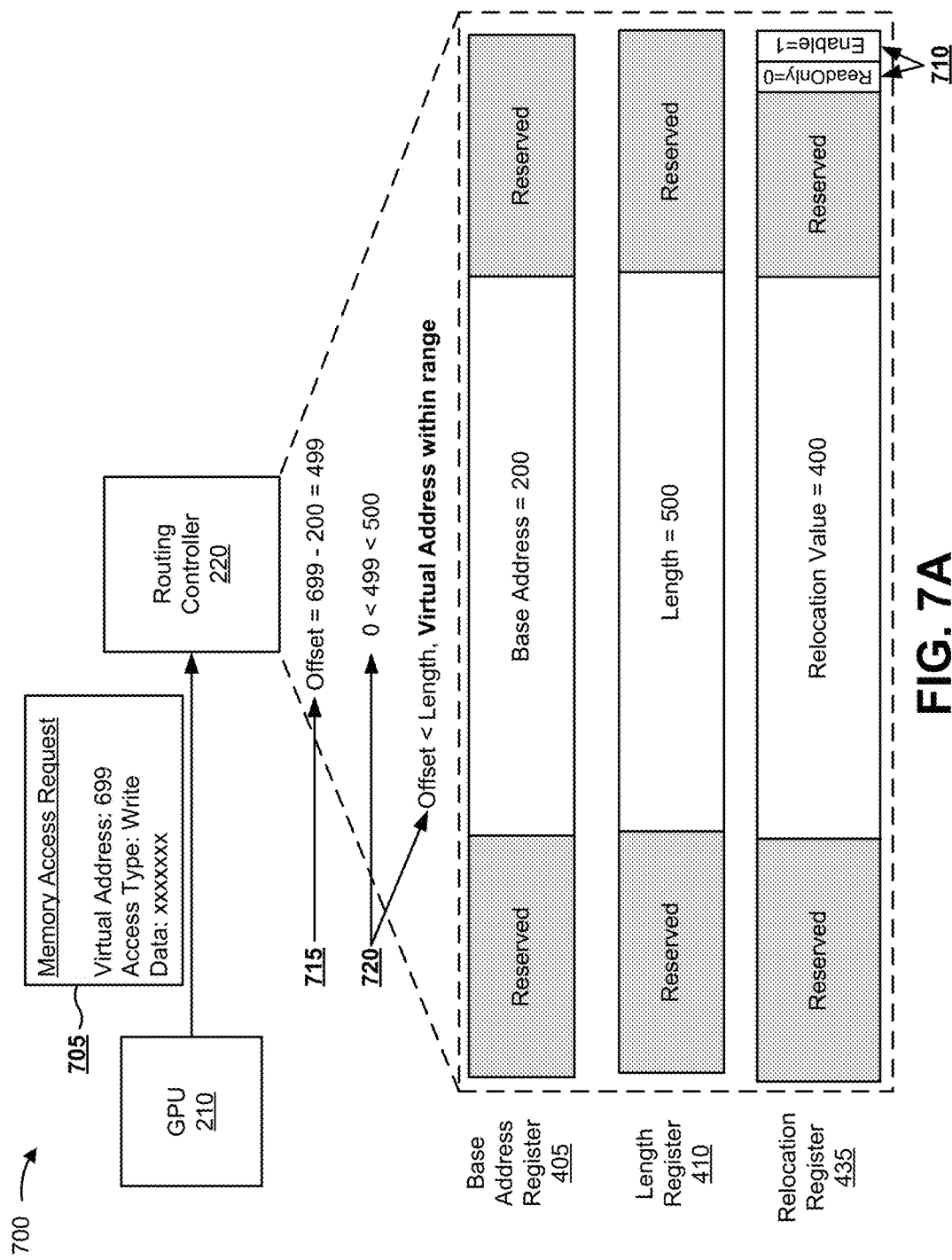
FIGS. 7A and 7B are diagrams of another example embodiment relating to the example process shown in FIG. 5.
Figure 7B:
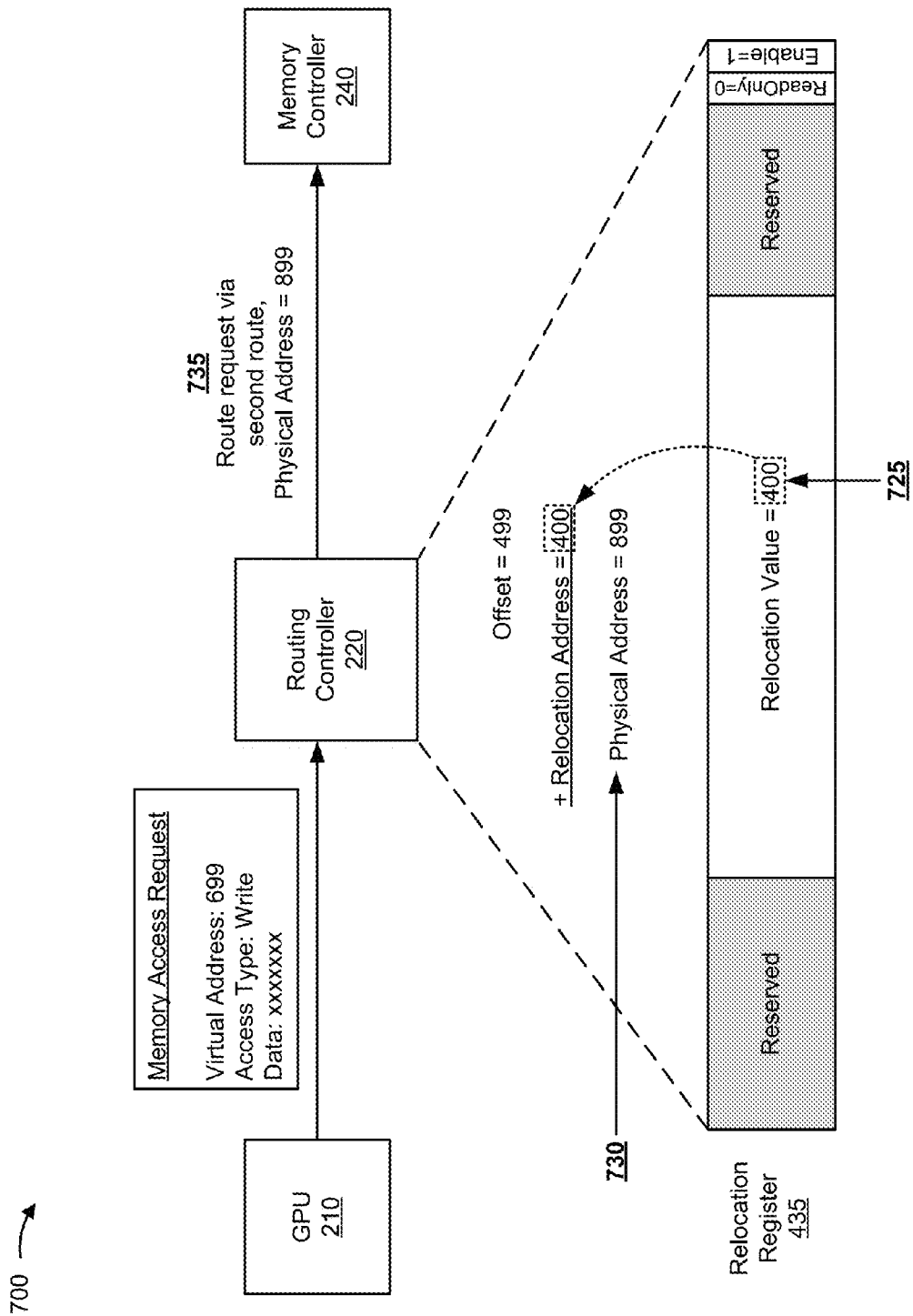

FIGS. 7A and 7B are diagrams of another example embodiment 700 relating to example process 500 shown in FIG. 5. FIGS. 7A and 7B show an example of a routing decision that routes a memory access request via a second path that does not include IOMMU 230.

As shown in FIG. 7A, and by reference number 705, assume that GPU 210 provides a memory access request to routing controller 220. As shown, assume that the memory access request identifies a virtual address of 699, identifies an access type of write, and identifies some information to be written to a physical memory address corresponding to the virtual address of 699. As shown by reference number 710, assume that routing via the second route is enabled, and that write access is also enabled. As shown by reference number 715, routing controller 220 subtracts the base address value of 200 from the virtual address value of 699 to calculate an offset value of 499 (699−200=499). As shown by reference number 720, routing controller 220 determines that the offset value of 499 is greater than zero, and is less than the length value of 500. Based on this determination, routing controller 220 determines that the virtual address of 699 is within the range of virtual addresses associated with routing via the second route.

As shown in FIG. 7B, and by reference number 725, assume that routing controller 220 determines a relocation value of 400 stored in relocation register 435. As shown by reference number 730, routing controller 220 adds the relocation value of 400 to the offset value of 499 to generate a physical address value of 899 (499+400=899). As shown by reference number 735, routing controller 220 routes the memory access request, including information that identifies the physical address of 899, toward memory controller 240 via a second route that does not include IOMMU 230.

As indicated above, FIGS. 7A and 7B are provided merely as an example. Other examples are possible and may differ from what was described with regard to FIGS. 7A and 7B.

The foregoing disclosure provides illustration and description, but is not intended to be exhaustive or to limit the embodiments to the precise form disclosed. Modifications and variations are possible in light of the above disclosure or may be acquired from practice of the embodiments.

As used herein, a device or a component is intended to be broadly construed as hardware, firmware, or a combination of hardware and software.

Some embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the embodiments illustrated in the figures. The actual software code or specialized control hardware used to implement these systems and/or methods is not limiting of the embodiments. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible embodiments. In fact, many of these features may be combined in ways not specifically recited in the claims and/or disclosed in the specification. Although each dependent claim listed below may directly depend on only one claim, the disclosure of possible embodiments includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Similarly, a "set" is intended to include one or more items, and may be used interchangeably with "one or more." Where only one item is intended, the term "one" or similar language is used. Also, as used herein, the term "having" is intended to be an open-ended term. Further, the phrase "based on" is intended to mean "based, at least in part, on" unless explicitly stated otherwise.

What is claimed is:

1. A method for calculating a physical address based on a received virtual address, comprising:
    calculating, by a device, an offset value based on the received virtual address,
        the offset value being equal to the received virtual address minus a base address;
    determining, by the device and when the offset value is negative, that the received virtual address is outside a predetermined range;
    comparing, by the device and when the offset value is zero or positive, the offset value to a length value,
        the received virtual address being outside the predetermined range when the offset value is greater than the length value, and
        the received virtual address being within the predetermined range when the offset value equals zero or when the offset value is less than the length value;
    determining, by the device and when the received virtual address is within the predetermined range, whether an access type associated with the received virtual address is permitted;
    calculating, by the device, the physical address via a first processing path when the access type is not permitted or when the received virtual address is outside the predetermined range; and
    calculating, by the device, the physical address, via a second processing path and based on the offset value and a relocation value, when the access type is permitted,
        the second processing path being faster than the first processing path.

2. The method of claim 1, where the received virtual address is included in a received direct memory access request.

3. The method of claim 1,
    where the first processing path includes an address translation algorithm that utilizes a page table to translate the received virtual address to the physical address.

4. The method of claim 1, where the predetermined range is defined by a first threshold value and a second threshold value, different than the first threshold value.

5. The method of claim 1, where the physical address is calculated, via the second processing path, by combining the offset value and the relocation value.

6. The method of claim 1,
    where the first processing path includes an input/output memory management unit (IOMMU); and
    where the second processing path does not include the IOMMU.

7. The method of claim 1, where the physical address is associated with a memory device.

8. A device, comprising:
    a controller to:
        calculate an offset value based on a received virtual address,
            the offset value being equal to the received virtual address minus a base address;
        determine, when the offset value is negative, that the received virtual address is outside a predetermined range;
        compare, when the offset value is zero or positive, the offset value to a length value,
            the received virtual address being outside the predetermined range when the offset value is greater than the length value, and
            the received virtual address being within the predetermined range when the offset value equals zero or when the offset value is less than the length value;
        determine, when the received virtual address is within the predetermined range, whether an access type associated with the received virtual address is permitted;
        calculate a physical address via a first processing path when the access type is not permitted or when the received virtual address is outside the predetermined range; and
        calculate the physical address, via a second processing path and based on the offset value and a relocation value, when the access type is permitted,
            the second processing path being faster than the first processing path.

9. The device of claim 8, where the received virtual address is included in a received direct memory access request.

10. The device of claim 8,
    where the first processing path includes an address translation algorithm that utilizes a page table to translate the received virtual address to the physical address.

11. The device of claim 8, where the predetermined range is defined by a first threshold value and a second threshold value, different than the first threshold value.

12. The device of claim 8, where the physical address is calculated, via the second processing path, by combining the offset value and the relocation value.

13. The device of claim 8,
    where the first processing path includes an input/output memory management unit (IOMMU); and
    where the second processing path does not include the IOMMU.

14. The device of claim 8, where the predetermined range is one of a plurality of ranges of virtual address values; and
    where the controller is further to:
        select the predetermined range from the plurality of ranges of virtual address values.

15. A system, comprising:
    one or more devices to:
    calculate an offset value based on a received virtual address;
    determine whether an access type associated with the received virtual address is permitted when, based on the offset value, the received virtual address is within a predetermined range;
    calculate a physical address via a first processing path when the access type is not permitted or when the received virtual address is outside the predetermined range; and
    calculate the physical address, via a second processing path and based on the offset value and a relocation value, when the access type is permitted,
        the second processing path being faster than the first processing path.

16. The system of claim 15, where the offset value equals the received virtual address minus a base address.

17. The system of claim 15, where the one or more devices are further to:
    determine, when the offset value is negative, that the received virtual address is outside that predetermined range; and
    compare, when the offset value is zero or positive, the offset value to a length value, the received virtual address being outside the predetermined range when the offset value is greater than the length value, and the received virtual address being within the predetermined range when the offset value equals zero or when the offset value is less than the length value.

18. The system of claim 15, where the predetermined range is defined by a first threshold value and a second threshold value, different than the first threshold value.

19. The system of claim 15, where the physical address is calculated, via the second processing path, by combining the offset value and the relocation value.

20. The system of claim 15, where the first processing path includes an input/output memory management unit (IOMMU); and where the second processing path does not include the IOMMU.

* * * * *